United States Patent
Kueppers et al.

(10) Patent No.: US 8,454,792 B2
(45) Date of Patent: Jun. 4, 2013

(54) COMPOSITION AND METHOD RELATING TO A HOT MELT ADHESIVE

(75) Inventors: Michelle C. Kueppers, North Oaks, MN (US); Steven W. Albrecht, Forest Lake, MN (US); Steven R. Vaughan, Chisago Lake Township, MN (US); Kevin P. Burge, North St. Paul, MN (US)

(73) Assignee: H.B. Fuller Company, St. Paul, MN (US)

(*) Notice: Subject to any disclaimer, the term of this patent is extended or adjusted under 35 U.S.C. 154(b) by 940 days.

(21) Appl. No.: 11/156,433

(22) Filed: Jun. 20, 2005

(65) Prior Publication Data

US 2006/0027320 A1 Feb. 9, 2006

Related U.S. Application Data

(60) Provisional application No. 60/600,041, filed on Aug. 9, 2004.

(51) Int. Cl.
*B32B 27/00* (2006.01)
*B29C 65/00* (2006.01)

(52) U.S. Cl.
USPC .......................................... 156/327; 156/701

(58) Field of Classification Search
USPC . 156/344, 327, 334, 325, 326, 701; 428/34.2; 53/447, 540, 541; 206/460
See application file for complete search history.

(56) References Cited

U.S. PATENT DOCUMENTS

| | | | |
|---|---|---|---|
| 3,113,673 A * | 12/1963 | Stein ...................... 229/120.011 |
| 3,356,765 A | 12/1967 | Musso et al. |
| 3,573,240 A * | 3/1971 | Flanagan ...................... 524/273 |
| 4,075,290 A | 2/1978 | Denzel et al. |
| 4,365,710 A * | 12/1982 | Swanson ...................... 206/386 |
| 4,826,909 A | 5/1989 | Lakshmanan et al. |
| 4,830,926 A | 5/1989 | Mostert et al. |
| 4,833,192 A | 5/1989 | Lakshmanan et al. |
| 4,833,193 A | 5/1989 | Sieverding et al. |
| 4,907,741 A * | 3/1990 | McIntyre ...................... 239/124 |
| 4,937,138 A * | 6/1990 | Mostert ...................... 442/171 |
| 4,956,207 A * | 9/1990 | Kauffman et al. ............ 428/34.2 |
| 5,024,888 A * | 6/1991 | Hwo et al. ............... 428/355 EN |
| 5,106,447 A | 4/1992 | Di Rado et al. |
| 5,256,717 A * | 10/1993 | Stauffer et al. ............... 524/293 |
| 5,419,431 A | 5/1995 | Neuber et al. |
| 5,450,708 A | 9/1995 | Lashyro |
| 5,624,986 A | 4/1997 | Bunnelle et al. |

(Continued)

FOREIGN PATENT DOCUMENTS

| | | |
|---|---|---|
| EP | 0 331 410 A | 9/1989 |
| EP | 0 518 045 A | 12/1992 |
| EP | 1 080 013 | 3/2001 |

OTHER PUBLICATIONS

Bulletin: "Polybutene-1 DP 8910 PC", Data Sheet, Basell Polyolefins, (2 pages), 2004.

(Continued)

*Primary Examiner* — John Goff
(74) *Attorney, Agent, or Firm* — Kirsten Stone; Kristi Halloran

(57) ABSTRACT

The present invention includes compositions relating to a hot melt adhesive that includes a copolymer of butene-1, a wax, and a tackifying resin. The present invention further relates to adhesives initially exhibiting adhesion properties and subsequently non-adhesion qualities. Methods of using these adhesives are also part of the claimed invention.

14 Claims, 1 Drawing Sheet

U.S. PATENT DOCUMENTS

| | | | |
|---|---|---|---|
| 5,627,229 | A | 5/1997 | Bunnelle et al. |
| 5,887,717 | A | 3/1999 | Anderson et al. |
| 6,008,148 | A | 12/1999 | Harris et al. |
| 6,114,261 | A | 9/2000 | Strelow et al. |
| 6,182,442 | B1 | 2/2001 | Schmidt et al. |
| 6,218,457 | B1 | 4/2001 | Fralich et al. |
| 6,244,502 | B1 | 6/2001 | Hollar et al. |
| 6,499,596 | B1 | 12/2002 | Anderson et al. |
| 7,048,817 | B1 | 5/2006 | Hammond |
| 2003/0150760 | A1 | 8/2003 | Andersen et al. |
| 2004/0253464 | A1 | 12/2004 | Krawinkel |

OTHER PUBLICATIONS

Bulletin: "Polybutene-1 for Hot Melt Adhesives", General Bulletin, Basell Polyolefins, (11 pages), Undated.

Bulletin: "Polybutene-1 Versatility, Value and Opportunity", General Bulletin, Basell Polyolefins, (11 pages), Undated.

\* cited by examiner

US 8,454,792 B2

COMPOSITION AND METHOD RELATING TO A HOT MELT ADHESIVE

CROSS-REFERENCE TO RELATED APPLICATIONS

This application claims the benefit of U.S. Provisional Application Ser. No. 60/600,041, filed on Aug. 9, 2004, which is incorporated herein.

FIELD OF THE INVENTION

The present invention relates to a hot melt adhesives such as an adhesive comprising a copolymer of butene-1, a wax, and a tackifying resin. The adhesives of the present invention are useful for temporarily bonding substrates.

BACKGROUND OF THE INVENTION

Hot melt adhesives are widely used for various applications. Typically, hot melt adhesives are designed to bond to and remain bonded to two substrate surfaces such that the two surfaces cannot be separated without damaging or destroying the substrates. For example, if the substrates are paperboard, a permanent bond may be formed by using typical hot melt adhesives such that if one attempts to separate the substrates, tearing and/or destruction of one or both of the substrates will occur. One disadvantage of such adhesives is that, in certain applications, it is desirable that the adhesive bond be strong, but temporary rather than permanent such that after a period of time, the substrates can be separated without destroying one or both substrates. Additionally, for some, but not all applications, any residual hot melt on the substrates may be seen as being aesthetically undesirable for some applications if the hot melt can easily be seen due to its color or if the hot melt remains tacky. On the other hand, some known hot melt adhesives release with the desirable aesthetic properties, but lack the necessary initial adhesion to be useful for many applications.

Therefore, there is a need in the art for an adhesive composition that allows for binding of two substrates for a period of time and that subsequently loses its adhesive qualities, thereby allowing the two substrates to be easily separated without a negative aesthetic alteration of the substrates' surface.

BRIEF SUMMARY OF THE INVENTION

The present invention, in one embodiment, is a hot melt adhesive composition. The composition includes from about 10% by weight to about 80% by weight of a copolymer of butene-1, from about 5% by weight to about 60% by weight of a wax, and from about 5% by weight to about 70% by weight of a tackifying resin, wherein the composition initially exhibits adhesion qualities and subsequently exhibits non-adhesion qualities. In one embodiment, the composition exhibits adhesion in from about 0.5 seconds to about 30 seconds and subsequently exhibits non-adhesion in from about 11 minutes to about 24 hours. Compositions of the present invention may be non-pressure sensitive adhesives.

In an alternative embodiment, the present invention is a method of temporarily securing containers together. The method includes providing a hot melt adhesive composition of the present invention and applying the composition to a first substrate. A second substrate is applied to the composition on the first substrate, creating a bond between the first and second substrate. The composition creates the bond as it exhibits adhesion qualities initially, yet subsequently it exhibits non-adhesion qualities which enables the substrates to be separated without fiber tear.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the detailed description and examples are to be regarded as illustrative in nature and not restrictive. All weights are given as percentages of the total weight of the composition unless otherwise indicated. All references are incorporated herein in their entirety.

DRAWINGS

DETAILED DESCRIPTION

Figure 1:
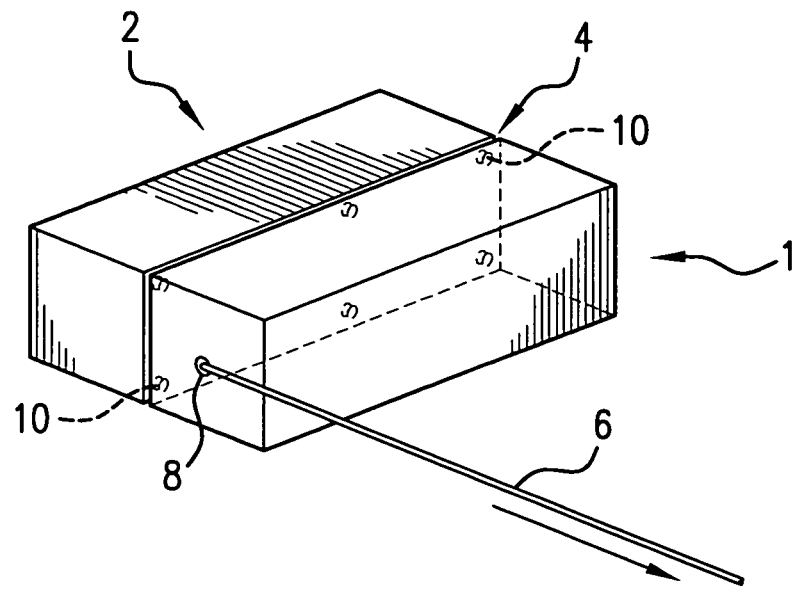
FIG. 1 is a perspective view.

The methods and compositions of the present invention are directed to a hot melt adhesive that initially exhibits adhesion qualities and subsequently exhibits non-adhesion qualities. More particularly, the adhesives of the present invention uniquely and unexpectedly undergo the following type of property changes sequentially: The adhesive as initially applied typically has little bond strength (e.g. will fail a Separation Resistance Test initially.) At about the "Set Time", a bond has formed (e.g. will pass a Separation Resistance Test at 10 seconds.) The bond then holds its integrity for a period of time (e.g. will pass the Separation Resistance Test for a period of time after 10 seconds). The adhesive then looses its adhesive qualities (e.g. will have no Fiber Tear). It is often beneficial for the adhesives to be non-tacky at this point.

These adhesives are thus useful in various applications, including palletizing and any other short-term temporary bonding applications where initially a bond between substrates is useful, such as temporarily bonding boxes together, and then subsequently the substrates (e.g. boxes) can be separated easily without unsightly Fiber Tear.

I. Composition: The compositions of the present invention have desired and unique combination of "adhesion" and "non-adhesion" properties as described and defined by tests below. Such compositions include compositions comprising copolymers of butene-1, a wax, and a tackifying resin as described in greater detail below. The compositions exhibit initial adhesion followed by subsequent non-adhesion.

A. Copolymer of butene-1: Copolymers of butene-1 can be included in the composition, for example, in an amount ranging from about 10% to about 80% by weight of the composition. Alternatively, the concentration ranges from about 20% to about 70% by weight of the composition. In a further alternative, the concentration ranges from about 30% to about 45% by weight of the composition.

Preferred copolymers of butene-1 are copolymers of butene-1 and a member selected from the group consisting of methylene, ethylene, propylene and mixtures thereof. In one aspect of the invention, the concentration of butene-1 in the copolymer is in an amount ranging from about 90% to about 99% by weight of the copolymer. Alternatively, the concentration of butene-1 ranges from about 92% to about 98% by weight of the copolymer. In a further alternative, the concentration ranges from about 94% to about 97% by weight.

In accordance with one embodiment, the concentration of methylene, ethylene, and/or propylene in the copolymer is in an amount ranging from about 1% to about 10% by weight of the copolymer. Alternatively, the concentration ranges from about 3% to about 9% by weight of the copolymer. In a further alternative, the concentration ranges from about 4% to about 8% by weight of the copolymer.

One particularly useful copolymer of butene-1 and ethylene can be purchased from, for example, Basell under the tradename PB-1™. PB-1™ is obtained by polymerization of butene-1 with a stereo-specific Ziegler-Natta catalyst to create a linear, high molecular, isotactic, semi-crystalline polymer.

B. Wax: The term "wax" is recognized in the art and is intended to include any viscosity, speed of set, or rheology modifiers. The wax can be, but is not limited to, paraffin wax, microcrystalline wax, synthetic wax (preferably high melt point), or functionalized versions of these. The concentration of the wax in the composition of the present invention is in an amount ranging from about 5% to about 60% by weight. Alternatively, the concentration ranges from about 10% to about 40% by weight. Various waxes can be purchased from, for example, Exxon Mobil Chemical, Calumet, and Baker Petrolite.

The wax has been found to provide and/or contribute to numerous benefits when used with the other components of the present invention. For example, it can help reduce the viscosity of the composition, making the composition easier to apply to the substrate. Further, the wax can provide faster speed of set for the composition. Importantly, addition of the wax can lead to a subsequent crystallization of the composition as a result of its combination with the copolymer of butene-1, thereby resulting in the desired subsequent loss of adhesion.

C. Tackifying Resin: The composition also includes a tackifying resin. The term "tackifying resin" is recognized in the art and is intended to include those substances that provide tack and specific adhesion to the composition, thereby serving to secure elements to be bonded while the composition sets, and reduces the viscosity of the composition, making the composition easier to apply to the substrate. The tackifying resin can be, but is not limited to, rosins, rosin derivatives, terpenes, modified terpene resins, hydrocarbons, or modified hydrocarbon resins, such as those known in the art. The concentration of the tackifying resin in the composition of the present invention is in an amount ranging from about 5% to about 70% by weight. Alternatively, the concentration ranges from about 10% to about 60% by weight. In a further alternative, the concentration ranges from about 25% to about 55% by weight. Various tackifying resins can be purchased from, for example, Arizona Chemical, Exxon Mobil Chemical, and Eastman Chemical.

D. Optional Ingredients: In accordance with an alternative embodiment, the composition of the present invention can include an antioxidant. The term "antioxidant" is recognized in the art and is intended to include those substances that interfere with the auto-oxidation process. According to one embodiment, the antioxidant stabilizes the adhesive formulation of the present invention against degradation. The antioxidant can be, but is not limited to, IRGANOX 565™, IRGANOX 1010™, and IRGANOX 1076™, which are hindered phenolic antioxidants and are available from Ciba Geigy. The concentration of the antioxidant in the composition of the present invention may be in an amount ranging from about 0.1% to about 1% by weight.

In an alternative aspect of the present invention, the composition can also include one or more additional polymers, including but not limited to homopolymers of butene-1. When formulating with additional polymers, the butene-1 copolymer should comprise enough of the total polymer content to sustain the desired property performance. For example, it may comprise at least 50% by weight of the total polymer content (copolymer of butene-1 plus additional polymer such as the homopolymer of butene-1, EVA, etc.). Preferably, the copolymer of butene-1 can comprise 70%, 75%, 80%, or even 90% by weight of the total polymer content if a second polymer is used in the formulation.

The present invention can also include colorants/pigments/dyes as may be desirable for the adhesive to match the coloring of the substrate for aesthetic purposes.

II. Methods of Making Composition: In one aspect of the present invention, the composition is made in the following manner. The components of the composition, other than any polymers to be included, are blended in a molten state at any known temperature for blending components of a hot melt adhesive to form a mixture (e.g. until smooth and homogeneous). Alternatively, the components are melted at a temperature ranging from about 150° C. to about 175° C. According to one embodiment, the components are melted in a forced-air type oven. The temperature of the mixture may be maintained, e.g., using a heating mantle such as those manufactured by Glas-Col in Terre Haute, Ind. or by any known method or apparatus.

In one aspect of the invention, the polymer component or components are then added to the mixture. The polymer component can be added in an upright or lightening mixer such as the STIRRER TYPE RZRI™ manufactured by Caframo in Wiarton, Ontario, Canada. Alternatively, the polymer or polymers can be added by any known method or apparatus.

In one aspect of the present invention, any antioxidant component is added with the initial components. Alternatively, the antioxidant is added at any time during the preparation of the composition, including when the polymer or polymers are added.

In a more specific method of making compositions of the present invention, hoppers are filled with the components and metered into a twin screw extruder. The material then is extruded together under high shear through the system with minimal heat exposure and a short duration, at which point the material is cut into pellets.

III. Articles, Uses & Adhesive Bond Properties: In use, the composition of the present invention can be applied to a substrate in order to be temporarily bonded with another substrate. For example, the composition is particularly useful in temporarily adhering two or more containers together. As used herein, the term "containers" includes but is not limited to paperboard cartons, bottles, corrugated boxes, bags (paper and plastic) and the like. Similarly, "substrates" means any surface being bonded unless otherwise specified.

One particularly useful application involves temporarily adhering paperboard cartons such as are commonly used for delivering consumer goods to the general public, e.g. at a grocery store. It is often desirable for such cartons to be temporarily adhered together while the cartons are, e.g. filled with goods and/or sealed on an automated line. The composition has initial bond strength sufficient to hold the cartons together during processing as desired, but then has subsequent loss of adhesion such that the cartons can easily be separated, e.g. at a point of sale. Such separation occurs without leaving unsightly fiber tear on the carton. Similarly, the compositions of the present invention can be used to hold two or more containers together during transport to the final point of sale such as a grocery store. Alternatively, at least one of the substrates can be a coupon, tag, or other substrate that is not a container that needs to be temporarily adhered to, e.g., a package, and subsequently removed without damaging the container or the coupon/tag.

It is useful for the compositions to have viscosities such that they can be placed into known hot melt adhesive application equipment and extruded through a nozzle on the application equipment or applied to a roller and transferred to a first substrate creating a first bonding surface. A second substrate can then be mated with the first bonding surface. For example, the compositions could have viscosities of from about 40 to about 1830 centipoise ("CPS")as measured in accordance with ASTM D-3236 taken at 350° F. (177° C.). The melt viscosities of the hot melt adhesives were determined on a Brookfield Thermosel Viscometer Model LVDV 2+ using an appropriate spindle and speed. Alternatively, the composition is applied to a first substrate by any known method in order to ultimately bond a first substrate to a second substrate through the compositions of the present invention.

The period of time required for the bond to form is called the "Set Time". After the mating of the two substrates, the composition initially exhibits adhesion that causes a bond to form between the two substrates. A bond forms in a time period ranging e.g. from about 0.5 seconds to about 30 seconds after application. This is the "Set Time" for the adhesive, which can conveniently be determined by the test method below. Alternatively, the bond forms in a time period ranging from about 1 second (or even less) to about 20 seconds, or even from about 5 seconds to about 10 seconds. Having a fast enough Set Time, such as provided by the compositions of the present invention, is important particularly for high speed automated applications. The composition is required to have sufficient bond strength to sustain the intended end use, such as adhering two packages. Thus, the Separation Resistance Test described below is used to test the strength of adhesion. After a period of time, the composition begins to lose adhesion, and the bond between the two substrates is thereby weakened to the point that the two substrates can be easily separated without Fiber Tear. It should be understood that even when the substrates do not give fiber tear (e.g. plastic bottles), that the Fiber Tear test set forth herein is a useful test method for identifying loss of adhesion of an adhesive of the present invention. The composition loses adhesion (has no FT) in a time period ranging from about 11 minutes to about 24 hours after application of the composition. Alternatively, the composition loses adhesion in a time period ranging from about 20 minutes to about 18 hours, from about 40 minutes to about 8 hours, or even from 1 hour to about 4 hours after application. This loss of adhesion can be tested using the Coupon Test at various time intervals in order to mimic the effect an adhesive has on the aesthetics of a substrate upon separation. The time at which the Coupon Test results in no Fiber Tear is a time by which the composition has lost adhesion. For purpose of clarity, an adhesive demonstrating no Fiber Tear at 8 hours after application means that by 8 hours, the composition has lost adhesion sometime at or before 8 hours (i.e. it could have lost Fiber Tear at 2 hours). However, if the same adhesive has Fiber Tear at 4 hours, the composition looses adhesion somewhere after 4 hours and on or before 8 hours.

According to one embodiment, the composition is non-tacky after losing adhesion. As used herein, the term "non-pressure sensitive adhesive" refers to a composition that is not tacky after losing adhesion. A non-pressure sensitive adhesive may have a Loop Tack value, as defined herein, of less than about 5 ounces per inch after the adhesive loses adhesion as defined in the Coupon Test above. Alternatively, the composition may remain tacky where such a feature is not a detriment for the end application.

In accordance with a further aspect of the invention, the composition, as or after it loses adhesion, takes on a brittle, crystallized form. In this form, the composition can have a white appearance and/or can have a Gardner Color of about 1 or about 2. Such a white appearance typically has little or no negative aesthetic impact regardless of the color of the substrate it is bonding, and therefore may be desirable where multiple colors of substrates will be bonded by the same adhesive. Alternatively, the composition can be a different color and can even be colored to match the substrate color.

IV. Test Methods: The compositions of the present invention exhibit a unique set of physical properties over time as described above. The methods of testing for these physical properties at the various times are described herein.

A. Fiber Tear ("FT"): Fiber Tear measures the amount of fiber deposited on an adhesive when two substrates that are bonded together through the adhesive are separated. Specifically, the adhesive left on one of the two substrates is examined for fibers from the second of the two substrates. The percent FT is the visual estimation of the percent surface area the fibers comprise of the total surface area of the adhesive. For purposes of the present invention, in a preferred embodiment any amount of FT that is visually noticeable with the naked eye is aesthetically undesirable. Systems having such visually noticeable FT may be reported as a qualitative "Fiber Tear", and those not having such visually noticeable FT (about 0%) may be reported as a qualitative "No Fiber Tear".

FT is measured herein by a "Coupon Test" as follows. A 7 millimeter diameter dot of adhesive is deposited on a substrate using a MINI-SQUIRT™ at 350° F. (and ambient atmosphere). An open time of the test of 1 second (before mating with the second substrate) and a compression time (set time) of 2 seconds is allowed. At this point, the resulting bonds are then pulled apart by hand at various time intervals ranging from 1 second to 24 hours and the substrates are examined for FT. When doing this test, 3 samples should be tested at each time interval and a subjective, non-quantitative determination of "Fiber Tear" or "No Fiber Tear shall be made by the tester. For purposes of clarity, the tester of ordinary skill in the art may notice that 2 of the 3 samples clearly have "No Fiber Tear" and the $3^{rd}$ has a very small amount of "Fiber Tear", but still may report that time interval as having "No Fiber Tear" within their reasonable discretion. It is desirable to have FT at 1 minute demonstrating the existence of a bond up until at least this 1 minute mark. If the adhesive has either not set or has lost the bond by the 1 minute mark, it is said to "Fail" the Coupon Test since it is desirable for the adhesives of the present invention to have adhesion sufficient to induce FT at about 1 minute. As an indication of the loss of adhesion over time, it is desirable to have no FT after about 11 minutes, 30 minutes, 1 hour, or even 2 hours or greater from application of the adhesive. If the adhesion is lost after 1 minute and before about 11 minutes, it is also said to "fail" due to a premature release. Thus, the Coupon Test results can be reported by listing any time interval where the adhesive gives "no Fiber Tear", although one of ordinary skill in the art should recognize that an adhesive/substrate having "no Fiber Tear" at 30 minute, and "Fiber Tear" at 5 minutes means that it is possible there would also be "no Fiber Tear" at 10 minutes. If more precision was desired, the tester could also test at 10 minutes. However, one of ordinary skill in the art will also recognize that like many tests, there is some subjectivity to the test so too many data points at close time intervals will not be useful. The Coupon Test results reported herein use portions of paperboard cut from COCA COLA® CLASSIC COKE FRIDGE PACK.

Where it is desirable to ultimately bond surfaces substantially different from the COCA COLA® CLASSIC COKE FRIDGE PACK paperboard, the Coupon test can be modified and the substrate(s) intended to be bonded substituted (thus, they can be 2 different substrates as well). This will be referred to as a "Modified Coupon Test" herein. The Modified Coupon Test can be a useful, quick test to help determine, e.g., more specifically when the specific substrates to be bonded can be separated without Fiber Tear for a particular adhesive. Thus, the Modified Coupon Test can be particularly useful in quickly identifying the very best product for a particular application.

Figure 2:
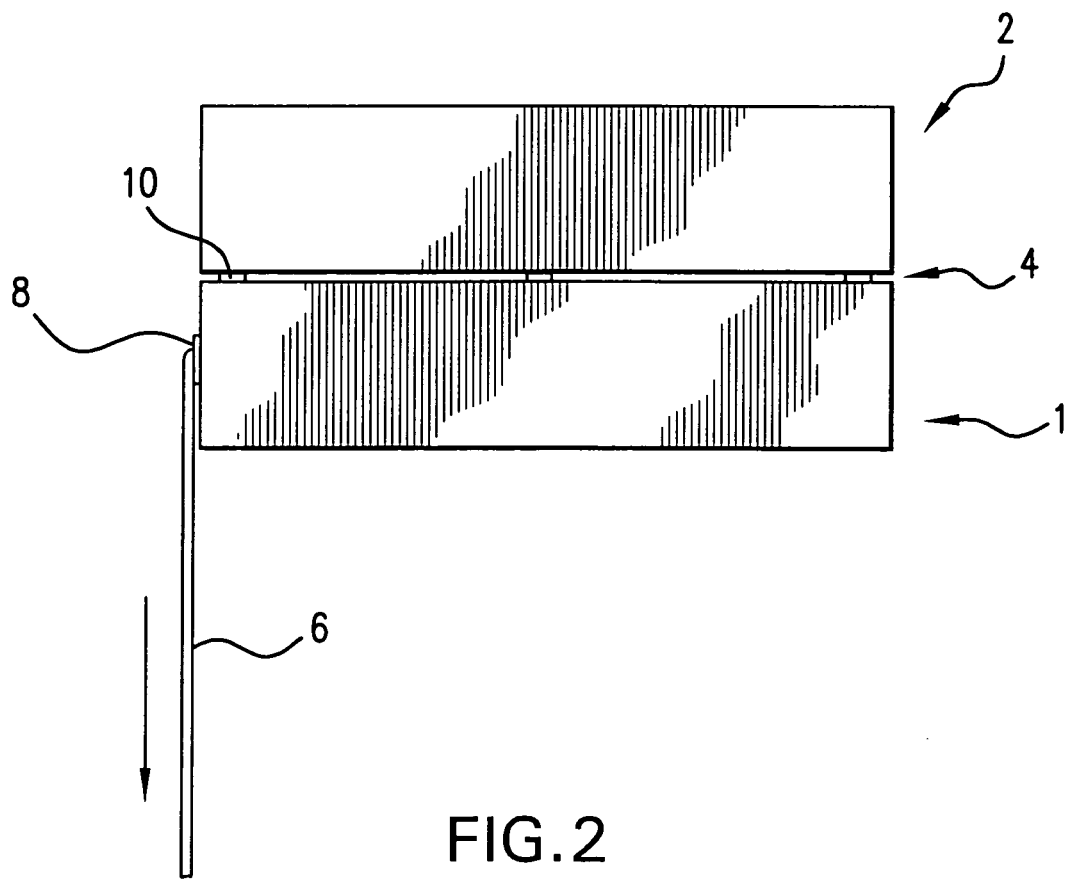
FIG. 2 is a top view of containers adhered with compositions of the present invention illustrating the string attachment and pull direction for the Separation Resistance Test and Modified Separation Resistance Test used herein.

B. Separation Resistance: Separation Resistance is a measure of adhesiveness related to the amount of force required to separate two paperboard boxes that are mated to each other using an adhesive of the present invention. FIGS. 1 and 2 are intended to assist with setting up this test. The test uses two paperboard FRIDGE PACK boxes used for packaging COCA COLA® CLASSIC COKE products having dimensions of 15.5 inches long by 5.25 inches wide by 5.25 inches high and have contents with a total weight of 4500 grams. For purposes of the test, six dots of about the same size 10, totaling about 0.6 grams of adhesive, are applied to one external surface (measuring 15.5 inches long by 5.25 inches high) of the first box 1. The dots are applied in the following manner. One dot is placed in each corner of the box side and each of the remaining two dots is placed at the mid-point along each of the two long edges of the box side. Care is taken to apply the adhesive at the can peaks (the rounded edge portion in contact with the box edge rather than in between two cans) in order to get adequate adhesion upon mating the boxes.

After one second, a second box 2 is mated to the first box 1 such that the side of the first box with the adhesive dots is mated to a side of the second box with the same dimensions, forming an adhesive bond line 4. The mated boxes are then placed such that they are positioned side-by-side on a typical smooth epoxy finish black lab bench top. A string 6 is then attached to the center of the first box end 8. After, e.g., either 10 seconds or 1 minute from the time the cartons were mated, the first box end is gently (without quick or jerky motions) pulled away from the second box by applying a pulling force in a direction away from and perpendicular to the adhesive bond line 4 for a distance of about a typical adult arm's length (the first box end may follow a curved path with the end opposite the string attachment moving very little). The point of this test is to mimic normal forces that may cause the boxes to prematurely separate, e.g. on an automated line, if the adhesive is not strong enough. The test can be repeated at various time intervals. The Separation Resistance test is said to "fail" if there is a premature release of the cartons without fiber tear as when the adhesive has little/no strength because it has not set up or it releases prematurely. The test is said to "pass" if the boxes remain attached for the duration of the test or if they separate, but with fiber tear (fiber tear here indicates the box failed, not the adhesive).

Where it is desirable to ultimately bond packages weighing substantially less than 4500 grams, a Modified Separation Resistance test can be used as the adhesive will not be required to produce as strong of a bond in order to function for its intended purpose. In the Modified test, the COCA COLA® CLASSIC COKE FRIDGE PACKS are filled with only 300 grams and the Separation Resistance test as described above is otherwise repeated. The "pass" and "fail" definitions above also apply.

Alternatively, in a Customized Separation Resistance test, representative samples of the actual, full, rectangular paperboard packages intended to be temporarily bonded together are used in the Separation Resistance test described above so that not only the weight, but also the substrate surface match the "real world" exactly. One of ordinary skill in the art will readily recognize how to customize the test to scale the test to fit the package size. For example, the string should be attached to a smallest end of the package if the package has sides of varying surface areas. A package side having the greatest surface area should be in contact with the bench top. The adhesive will be applied to a surface of a first package that will be mated to a surface of the second package as described above.

C. Set Time: The Set Time of the adhesives of the present invention can be measured using the Separation Resistance test. Once the packages are mated, the test is performed at 10 second intervals (or less if more precision is desired) and the first time at which the Separation Resistance test is passed equals the Set Time for that adhesive. If more precision is desired, the Modified Separation Resistance test can be used.

D. Loop Tack: Loop Tack is a measure of tackiness. More specifically, Loop Tack is a measure of adhesion to a steel surface and is measured using a Loop Tack Tester available from Cheminstruments in Fairfield, Ohio. First, the adhesive being tested is coated on mylar, which is cut into 1⅛ inch×5 inch strips. Each strip is formed into a loop in which the adhesive is on the outer surface of the loop, and the loop is placed into contact with a steel plate in the tester. The tester measures the force required to remove the loop from the steel plate in ounces per inch. For purposes of the present invention, Loop Tack is measured after the adhesive has lost adhesion according to the Coupon Test (e.g. 1 minute after the Coupon Test shows no fiber tear) as the intent is to determine whether or not the adhesive is tacky or is a non-pressure sensitive adhesive after it has performed the intended purpose of temporarily adhering two substrates together.

E. Gardner Color: Gardner Color is a measure of color. The sample adhesive is compared to the Gardner Color Standards as set forth in ASTM D-1544. The color is identified by choosing the color standard of the 18 Gardner Color Standards that most closely matches the sample color.

The following examples are presented by way of demonstration, and not limitation, of the invention. The "comparative" examples are provided to demonstrate examples outside the scope of the invention.

TABLE 1

| Formulas | Example 1 | Example 2 | Example 3 | Example 4 |
|---|---|---|---|---|
| DP-8910PC (PB-1 ™ - Basell) (copolymer of butene-1 and ethylene) | 33.25% | 35% | 40% | 35% |
| Escorez 5637 from Exxon (tackifying resin) | 28.5% | 30% | 34.5% | 34.5% |
| CALUMET FR6513 (Paraffin 155 ™ wax) | 32.75% | 34.5% | — | 15% |
| Irganox ® 1010 from Ciba Geigy (antioxidant) | 0.5% | 0.5% | 0.5% | 0.5% |
| PX-100 ™ from Petrolite (wax) | 5% | — | — | — |
| Paraflint C80 ™ from Moore & Munger (wax) | — | — | 25% | 15% |
| Viscosity (CPS at 350° F.) | 650 | 820 | 1830 | 920 |

TABLE 2

| Properties | Example 1 | Example 2 | Example 3 | Example 4 |
|---|---|---|---|---|
| Separation Resistance (Set Time - 10 seconds) | Pass | Pass | Pass | Pass |
| Separation Resistance (1 minute) | Pass | Pass | Pass | Pass |
| Separation Resistance (10 Minutes) | Pass | Pass | Pass | Pass |
| Coupon Test and Modified Coupon Test | No FT at x min. | No FT at x hours, | No FT at x min. | No FT at x min. |
| a. COCA COLA ® CLASSIC | x = : a. 40 | x = : a. 3-4 | x = : a. 20-30 | x = : a. 20-30 |
| b. Caffeine Free COCA COLA ® CLASSIC | b. 60 | b. 2-3 | | |
| c. SPRITE ® | c. 50 | c. 3-4 | | |
| d. Diet SPRITE ® | d. 15 | d. 1.5-2 | | |
| e. Vanilla COKE ® | e. 210 | e. FT[1] | | |
| f. MINUTE MAID ® | f. 50 | f. 1.5-2 | | |
| g. DR. PEPPER ® | g. 210 | g. FT[1] | | |
| h. Diet DR. PEPPER ® | h. 90 | h. FT[1] | | |
| i. Diet COKE ® | i. 20 | i. 2-3 | | |
| Modified Separation Resistance Test (Set Time - 10 seconds) | Pass | Pass | Pass | Pass |
| Modified Separation Resistance Test (1 minute) | Pass | Pass | Pass | Pass |
| Gardner Color of adhesive after non-adhesion | 2 (white) | 2 (white) | 2 (white) | 2 (white) |
| Loop Tack after loss of adhesion (ounces/inch) | <5 | <5 | <5 | <5 |

[1] "FT" here means there is still significant fiber tear after 24 hours

TABLE 3

| Formulas | Example 5 | Example 6 | Example 7 | Example 8 |
|---|---|---|---|---|
| DP-8910C (PB-1 ™ - Basell) (copolymer of butene-1 and ethylene) | 10% | 24.9% | 29.9% | 35% |
| PB-0800M from Basell (homopolymer of butene-1) | — | 8.35% | 3.35% | — |
| Escorez 5637 from Exxon (tackifying resin) | 29.5% | 28.5% | 28.5% | 34.5% |
| CALUMET FR6513 (Paraffin 155 ™ wax) | — | 32.75% | 32.75% | — |
| Irganox ® 1010 from Ciba Geigy (antioxidant) | 0.5% | 0.5% | 0.5% | 0.5% |
| PX-100 ™ from Petrolite (wax) | 60% | 5% | 5% | 30% |
| Viscosity (CPS at 350° F.) | 40 | 690 | 675 | 1336 |

TABLE 4

| Properties | Example 5 | Example 6 | Example 7 | Example 8 |
|---|---|---|---|---|
| Separation Resistance (Set Time) (10 seconds) | Fail | Pass | Pass | Pass |
| Separation Resistance (1 minute) | Fail | Pass | Pass | Pass |
| Separation Resistance (10 Minutes) | Fail | Pass | Pass | Pass |
| Coupon Test on COCA COLA ® CLASSIC | No FT at <.5 minutes | No FT at 15 minutes | No FT at 35 minutes | No FT at 15 minutes |
| Modified Separation Resistance Test (Set Time) (10 seconds) | Pass | Pass | | |
| Modified Separation Resistance Test (1 minute) | Pass | Pass | | |
| Gardner Tack after loss of adhesion (ounces/inch) | <5 | <5 | <5 | <5 |

Alternatively, the Examples 1-8 are formulated with copolymers of butene-1 and a member selected from the group consisting of methylene, ethylene, and/or propylene instead of the DP-8910PC.

TABLE 5

Comparative Formulas

| | Comparative Example 1 | Comparative Example 2 | Comparative Example 3 | Comparative Example 4 |
|---|---|---|---|---|
| Escorez 5637 from Exxon (tackifying resin) | 28.5% | 28.5% | 28.5% | 50% |
| CALUMET FR6513 (Paraffin 155 ™ wax) | 32.75% | 32.75% | 32.75% | — |
| Irganox ® 1010 from Ciba Geigy (antioxidant) | 0.5% | 0.5% | 0.5% | 0.5% |
| PX-100 ™ from Petrolite (wax) | 5% | 5% | 5% | — |
| GA-1900 from Dow | 33.25% | — | — | — |
| EVA 28-800 from AT Plastics (EVA polymer) | — | 33.25% | — | — |
| Epolene C16 from Eastman Chemical | — | — | 33.25% | — |
| PB-0800M from Basell (homopolymer of butene-1) | — | — | — | 12.5% |
| DP-8910PC (PB-1 ™ - Basell) (copolymer of butene-1 and ethylene) | — | — | — | 37% |

TABLE 6

Comparative Properties

| | Comparative Example 1 | Comparative Example 2 | Comparative Example 3 | Comparative Example 4 |
|---|---|---|---|---|
| Separation Resistance (10 seconds) (Set Time) | Fail | Pass | Pass | — |
| Separation Resistance (1 minute) | Fail | Fail | Fail | — |
| Coupon Test | No FT at 1 minute . . . Fail | No FT at 1 minute . . . Fail | No FT at 1 minute . . . Fail | FT after 24 hours . . . Fail |

Comparative Example 5 is a standard EVA based packaging hot melt commercially available from H.B. Fuller Company as HM 2835Y. It contains no homopolymers or copolymers of butene-1. It passes both the 10 second and the 1 minute Separation Resistance test, but does not release in the Coupon Test after 24 hours (fails).

Comparative Example 6 is a standard EVA based packaging hot melt commercially available from H.B. Fuller Company as HL 7674. It contains no homopolymers or copolymers of butene-1. It does not release in the Coupon Test after 24 hours (fails).

What is claimed is:

1. A method of using a composition to temporarily bond two or more containers comprising:
   a. providing a first container and a second container;
   b. applying the composition to a first surface of the first container creating a first bonding surface; and
   c. contacting the first bonding surface to the second container forming a bond;
   wherein the composition initially exhibits adhesion qualities and subsequently exhibits non-adhesion qualities such that when subjected to a Coupon Test results in Fiber Tear after about 5 minutes and no Fiber Tear after about 8 hours; and wherein the composition comprises:
   (a) from about 10% by weight to about 80% by weight of an isotactic copolymer of butene-1 and a member selected from the group consisting of ethylene, propylene and mixtures thereof;
   (b) from about 5% by weight to about 60% by weight of a wax; and
   (c) from about 5% by weight to about 70% by weight of a tackifying resin.

2. The method of claim 1 wherein the first and second container comprise paperboard.

3. The method of claim 1 wherein the composition, when subjected to a Modified Coupon Test using the first container and the second container, results in Fiber Tear after 2 minutes and no Fiber Tear after 12 hours.

4. A method according to claim 1 wherein said composition has a Loop Tack after about 12 hours of less than about 5 ounces per inch.

5. The method according to claim 1 wherein the composition has a viscosity at 350° F. of from about 40 CPS to about 1830 CPS.

6. The method according to claim 1 wherein the composition is extruded through a nozzle in step b.

7. The method according to claim 1 wherein the composition has a Set Time of from about 0.5 seconds to about 30 seconds.

8. The method according to claim 1 wherein the composition consists essentially of
   (a) from about 10% by weight to about 80% by weight of an isotactic copolymer of butene-1 and a member selected from the group consisting of methylene, ethylene, propylene and mixtures thereof;
   (b) from about 5% by weight to about 60% by weight of a wax; and
   (c) from about 5% by weight to about 70% by weight of a tackifying resin.

9. The method according to claim 1 wherein the isotactic copolymer is in an amount of from about 20% by weight to about 70% by weight.

10. The method according to claim 1 wherein the isotactic copolymer is in an amount of from about 30% by weight to about 45% by weight.

11. The method according to claim 1 wherein the wax is in an amount of from about 10% by weight to about 40% by weight.

12. The method according to claim 1 wherein the wax is chosen from paraffin wax, microcrystalline wax, synthetic wax, functionalized versions thereof, or mixtures thereof.

13. The method according to claim 1 wherein the tackifying resin is in an amount of from about 25% by weight to about 55% by weight.

14. The method according to claim 8 wherein the composition has a viscosity at 350° F. of from about 40 cps to about 1830 cps.

* * * * *